C. McCREARY.
MECHANICAL MOVEMENT.
APPLICATION FILED AUG. 21, 1916.
1,262,817.
Patented Apr. 16, 1918.
2 SHEETS—SHEET 1.
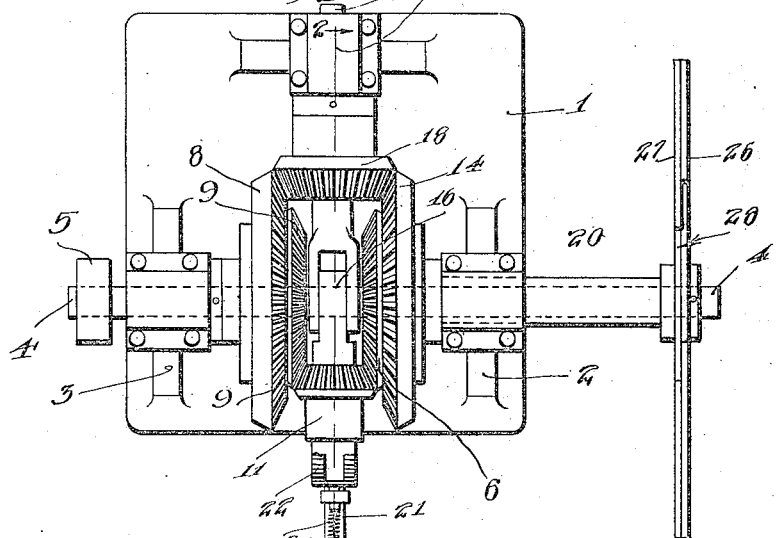
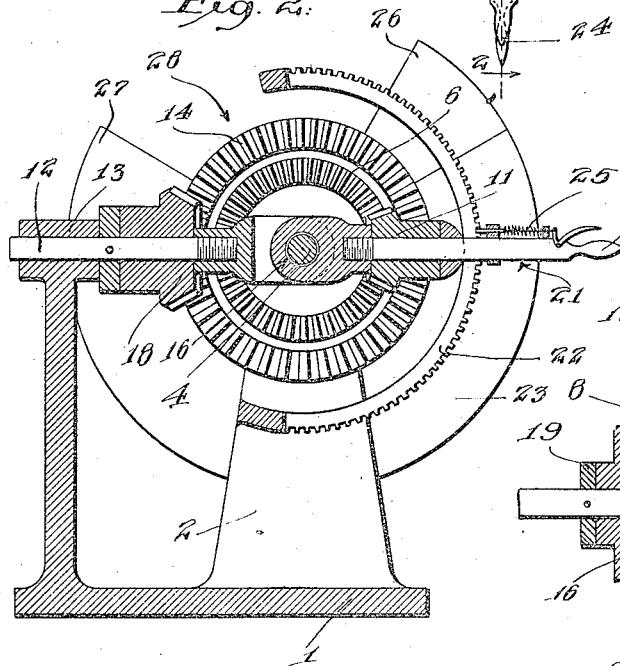
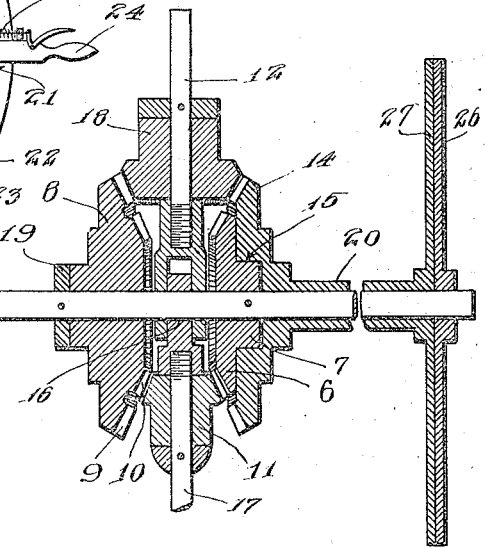
Witnesses:
Inventor
Charles McCreary
By Frederick Bhyen atty.

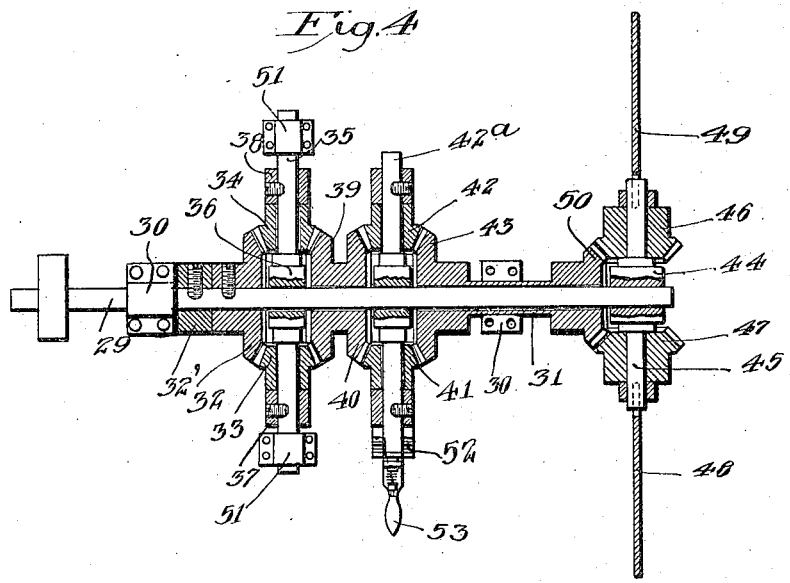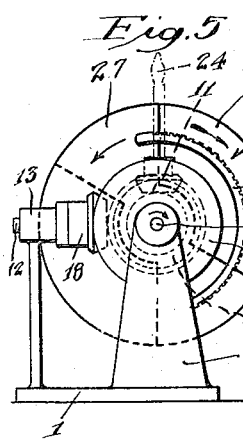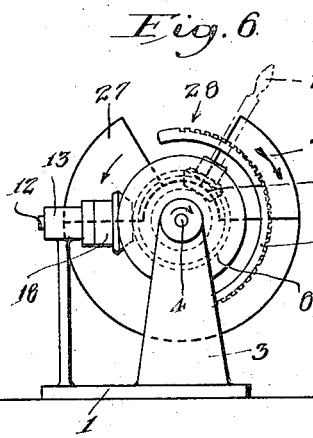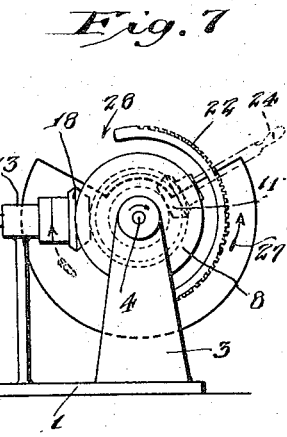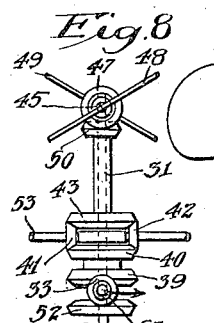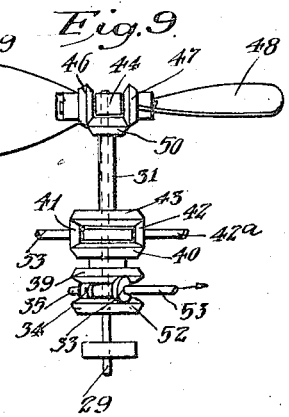

UNITED STATES PATENT OFFICE.

CHARLES McCREARY, OF LOS ANGELES, CALIFORNIA.

MECHANICAL MOVEMENT.

1,262,817.  Specification of Letters Patent.  Patented Apr. 16, 1918.

Application filed August 21, 1916. Serial No. 115,946.

*To all whom it may concern:*

Be it known that I, CHARLES MCCREARY, a citizen of the United States, residing at Los Angeles, in the county of Los Angeles and State of California, have invented a new and useful Mechanical Movement, of which the following is a specification.

This invention relates to improvements in mechanical movements, and more particularly to apparatus in which two members such as shafts may be rotated in the same direction at the same speed, and their arcuate relative positions varied during and without interfering with the rotation thereof.

Another object of this invention is to provide apparatus of the character described which may be put to various uses, for example can be utilized to change the throw of a reciprocating member as a reversing valve gear and so as to change the relative rotating positions of any two corresponding rotating members during the rotation thereof, such for instance as would be the case in changing the positions of the blades of a feathering propeller or the position of the shutters of a motion picture camera.

Another object is to provide apparatus of the character described which will be of simple comparatively small construction, is easy to operate and is inexpensive to manufacture.

In the accompanying drawings:

Figure 1 represents a top plan view of my invention showing it operating shutters such as used in a motion picture camera.

Fig. 2 is a cross sectional view taken on line 2—2, Fig. 1.

Fig. 3 is a horizontal sectional view taken on line 3—3 of Fig. 2.

Fig. 4 is a horizontal sectional view of a modified form of the invention showing it operating blades of a feathering propeller.

Fig. 5 is a diagrammatic view showing the shafts in normal position.

Fig. 6 is a view similar to Fig. 5 showing the shafts and members operated thereby in partly adjusted position.

Fig. 7 is a view similar to Figs. 5 and 6 showing the members operated thereby in fully adjusted position.

Fig. 8 is a diagrammatic view showing the modified form in normal position, and

Fig. 9 is a view similar to Fig. 8 showing the modified form in adjusted position.

In reference to the drawings, 1 designates a base or support for the apparatus, extending upwardly, from which are opposed bearings 2 and 3 in which is journaled a rotatable shaft 4.

A pulley 5 is fixed on one end of the shaft 4 and provides for the rotation of the shaft from a suitable source of power not shown. Rigidly secured to the shaft 4 is a beveled drive gear 6 which is formed with a boss 7 on its outer face. A larger beveled gear 8 is loosely mounted upon the shaft 4 and is provided with concentric rows 9 and 10 of facial teeth. The innermost row 10 meshes with a beveled pinion 11 which is interposed between the gears 6 and 8 and meshes with both. A shaft 12 is rigidly secured to a bearing 13 which is loosely mounted upon the shaft 4. A beveled gear 14 corresponding in size to the one 8 is loosely mounted upon the shaft 4 and is provided with a countersink 15 upon its inner face. The boss 7 extends within the countersink and the rear face of the gear 6 abuts the opposed face of the gear 14. Fixed to a bearing 16 that is loosely mounted upon the shaft 4 between the gears 6 and 8 is a shaft 17 upon which is loosely mounted the beveled pinion 11. A pinion 18 meshes with the gears 8 and 14 and transmits motion from the gear 8 to the gear 14. To hold the gears in contact and meshing position the gear 8 is held in place by a collar 19 fixed to the shaft 4.

A tubular shaft 20 carried by the gear 14 is mounted upon the shaft 4 and the means to be operated with the apparatus is connected with these shafts 4 and 20. The shaft 17 is journaled in a bearing 21 carried upon the base 1, said shaft lying in the same plane as the shafts 4.

A toothed quadrant 22 is carried by a standard 23 on the base 1 and extends upward over the shaft 4. The shaft 20 serves as a handle or lever and is provided with a hand grip 24 on its outer end. Suitable locking means 25 is carried upon the shaft 21 and coöperates with the quadrant 22. The quadrant 22 is slotted and the shaft 20 engages in the slot so as to be guided during its movement.

As shown in the drawings, the shafts 4 and 20 have circular shutter plates 26 and 27 secured thereto. These plates are of the type such as used in motion picture cameras, each being notched as at 28, When the shaft 4 is rotated clockwise, as indicated by arrows in the drawings, the gear 6 rotates correspondingly and causes the pinion 11 to rotate counterclockwise and the gear 8 which meshes with the pinion 11 to rotate counterclockwise also. The pinion 18 which meshes with the gear 8 rotates clockwise and transmits this motion to the gear 14. The gear 14 is rigidly connected with the shaft 20 and it will be seen that the plate 27 or any other member (not shown) connected with the shaft will be rotated in clockwise direction. As the plate 26 is rigidly connected with the shaft 4 it will also be rotated in a clockwise direction. Therefore the two plates 26 and 27 are rotated in the same direction and at the same rate of speed. When it is desired to change the relative rotating positions of these plates, without stopping the rotation thereof, the lever or shaft 21 is moved up or down from the position shown in Fig. 2 of the drawings, and this brings the plate 26 on the shaft into the desired position relative to the plate 27. This movement of the plate 26 is had during the rotation of both plates and it will thus be seen that the two plates can be rotated at the same rate of speed and their positions changed as desired without changing the direction of rotation or the speed of rotation of such plates. When the pinion 11 is moved up or down by the corresponding movement of the shaft 21, the gear 6 is rotated and as it is fixed upon the shaft 4, causes the shaft to rotate also. It is through this arrangement that the relative positions of the two shafts or members rotated thereby can be had.

Referring particularly to Fig. 4, the modified form of my invention comprises a drive shaft 29 which is journaled in suitable bearings 30 and has rotatably and loosely mounted thereon a tubular drive shaft 31. A drive beveled gear 32 engaging a collar 32' fixed to the shaft 29 is fixed to the shaft, and meshes with pinions 33 and 34. The pinions 33 and 34 are mounted upon opposite sides of the shaft 29 and a shaft 35, the latter being provided centrally with a bearing 36 which loosely receives the shaft 29. Collars 37 and 38 are fixed to the shaft 35 and hold the pinions 33 and 34 in position.

A beveled gear 39 is loosely mounted upon the shaft 29 and meshes with the pinions 33 and 34, said gear 39 being of the same diameter and opposite to the gear 32. Carried by the gear 39 and integral therewith preferably is a gear 40 which meshes with pinions 41 and 42 on a shaft 42$^a$ similar to the shaft 35. A gear 43 is loosely mounted upon the shaft 29 and is rigidly connected with the tubular shaft 31. The gears 40 and 43, also the pinions 42 and 41 are identical with those designated 32, 39 and 33, 34. This gearing is so constructed as to rotate the shafts 29 and 31 in the same direction and at the same rate of speed.

The shaft 29 extends beyond the outer end of the shaft 31 and fixed to the outer end of the shaft 29 is a bearing block 44 through which is extended a fixed shaft 45. Rotatably mounted upon the shaft 45 and on opposite sides of the block 44 are beveled gears 46 and 47 to which are rigidly connected propeller blades 48 and 49. The shaft 31 carries a beveled gear 50 which meshes with and is located between the gears 46 and 47.

The shaft 35 is journaled in a horizontal position in suitable bearings 51, whereas the shaft 42$^a$ is slidably mounted within an upright slotted toothed segment 52. This segment is similar to the one 22 in the preferred form of my invention, and the shaft 85 is extended through the slot and carries a handle portion 53 on the outer end thereof. A locking means is carried by the shaft and coöperates with the segment to hold the shaft in adjusted position. By moving the shaft up and down in the segment the pinions 41—42 are likewise moved and cause the gear 43 to rotate. Rotation of the gear 43 turns the shaft 31 and motion is transmitted through the gears 50, 46 and 47 to the respective blades 49 and 48. This rotation of the blades on their axes changes the relative positions thereof and may be effected during the rotation of the shaft 29. It will be seen that the blades operated by the shafts 29 and 31 may be made to assume the desired relative positions during their rotation without interfering with their rotation or changing the speed of rotation thereof. This modified form of my invention is in all respects identical with the preferred form except for the duplication of the gears such as shown in the preferred form.

It is to be understood that if desired the shaft 35 as well as the shaft 42$^a$ may be movably mounted upon the device in order that both may be moved in the opposite directions to effect the shifting of the driven shafts as desired. The movement of both shafts will result in the more rapid movement of the driven shafts and in the preferred form of the invention this arrangement may be carried out as well.

I claim:

1. In an apparatus of the character described, a driven shaft, bearings for said shaft, a member rotated by the shaft and connected therewith, a tubular shaft mounted upon the first shaft, a member connected with and adapted to be rotated by said tubular shaft, means to rotate the shafts in the same direction and at the same rate of speed, and means to change the relative positions of said members during the rotation thereof.

2. In an apparatus of the character described, a driven shaft, bearings for said shaft, a tubular shaft mounted upon the first shaft, gearing connecting the shafts and adapted to rotate them at the same rate of speed and in the same direction, and means associated with the gearing and shafts to change the relative rotating positions of the shafts during the rotation thereof.

3. In an apparatus of the character described, a driven shaft, bearings for said shaft, a tubular shaft mounted upon the first shaft, a gear rigidly connected with the first shaft, a gear rigidly connected with the tubular shaft, a gear meshing with said gears, a stationary shaft for supporting said last named gear, another gear meshing with said first and second named gears and being movable bodily relative thereto, a shaft for said last named gear, and means to adjustably support the shaft.

4. In an apparatus of the character described, a driven shaft, bearings for said shaft, a tubular shaft mounted upon the first shaft, a gear rigidly connected with the first shaft, a gear rigidly connected with the tubular shaft, a gear meshing with said gears, a stationary shaft for supporting said last named gear, another gear meshing with said first and second named gears and being movable bodily relative thereto, a shaft for said last named gear, means to adjustably support the shaft, and means to lock the last named shaft in adjusted position.

5. In an apparatus of the character described, a driven shaft, bearings for said shaft, a tubular shaft mounted upon the first shaft, a gear rigidly connected with the first shaft, a gear rigidly connected with the tubular shaft, a gear meshing with said gears, a stationary shaft for supporting said last named gear, another gear meshing with said first and second named gears and being movable bodily relative thereto, a shaft for said last named gear, means to adjustably support the shaft, and bearings for said last named shafts mounted upon the first named shaft between the first named gears.

6. In an apparatus of the character described, a driven shaft, bearings for said shaft, another shaft, a gear rigidly connected with each of said shafts, means to connect said shafts for rotation in the same direction and at the same speed operatively associated with said gears, a pinion located between and meshing with said gears, a shaft for said pinions, and means to adjustably support the shaft.

7. In an apparatus of the character described, a drive shaft, bearings for said shaft, another shaft, a gear rigidly connected with each of said shafts, means to connect said shafts for rotation in the same direction and at the same speed operatively associated with said gears, a pinion located between and meshing with said gears, a shaft for said pinion, means to adjustably support the shaft, and means to lock the last named shaft in adjusted position.

8. In an apparatus of the character described, a drive shaft, bearings for said shaft, another shaft, a gear rigidly connected with each of said shafts, means to connect said shafts for rotation in the same direction and at the same speed operatively associated with said gears, a pinion located between and meshing with said gears, a shaft for said pinion, means to adjustably support the shaft, and a bearing for said last named shaft loosely mounted upon the first named shaft.

9. In an apparatus of the character described, a drive shaft, a support for said drive shaft, a tubular shaft rotatably mounted upon the drive shaft, a gear fixed to said drive shaft, a gear loosely mounted upon the drive shaft and having concentric rows of teeth thereon, a pinion interposed between said gears and meshing therewith, an adjustable shaft for said pinion, a bearing for said shaft rotatably mounted upon the first named shaft, said pinion meshing with the innermost row of concentric teeth, a gear fixed to said tubular shaft, and a pinion meshing with said second and last named gears.

Signed at Los Angeles, California, this 9th day of August, 1916.

CHARLES McCREARY.

Witnesses:
 CHAS. J. CHUNN,
 MARY E. BLASDEL.

Copies of this patent may be obtained for five cents each, by addressing the "Commissioner of Patents, Washington, D. C."